United States Patent
Weigl

[15] 3,684,362
[45] Aug. 15, 1972

[54] TRANSPARENT ELECTRODE
[72] Inventor: John W. Weigl, West Webster, N.Y.
[73] Assignee: Xerox Corporation, Rochester, N.Y.
[22] Filed: Jan. 2, 1970
[21] Appl. No.: 87

[52] U.S. Cl. ..........................355/3, 355/12, 96/1.3
[51] Int. Cl. ...........................................G03g 15/00
[58] Field of Search ......355/3, 12, 17; 204/181, 300; 96/1.2, 1.3; 240/1 R

[56] References Cited

UNITED STATES PATENTS

| | | | |
|---|---|---|---|
| 2,892,709 | 6/1959 | Mayer | 96/1.3 |
| 3,384,565 | 5/1968 | Tulagin | 204/181 |
| 3,140,175 | 7/1964 | Kaprelian | 96/1.2 |
| 3,335,003 | 8/1967 | Snelling | 355/12 X |
| 3,427,242 | 2/1969 | Mihajlov | 204/300 |
| 2,357,732 | 9/1944 | Ehrlich | 240/1 R |

Primary Examiner—Samuel S. Matthews
Assistant Examiner—Robert P. Greiner
Attorney—James J. Ralabate, David C. Petre and Raymond C. Loyer

[57] ABSTRACT

An apparatus particularly useful for the production of copies in electrophotographic imaging processes comprising a rotatable cylinder, transparent to electromagnetic radiation, having an electrically conductive transparent coating thereon and having therein a source of electromagnetic radiation. The electrically conductive coating is covered with an electrically insulating coating. The device provides simultaneous application of an electric field across an imaging member and exposure of the imaging member to electromagnetic radiation.

15 Claims, 2 Drawing Figures

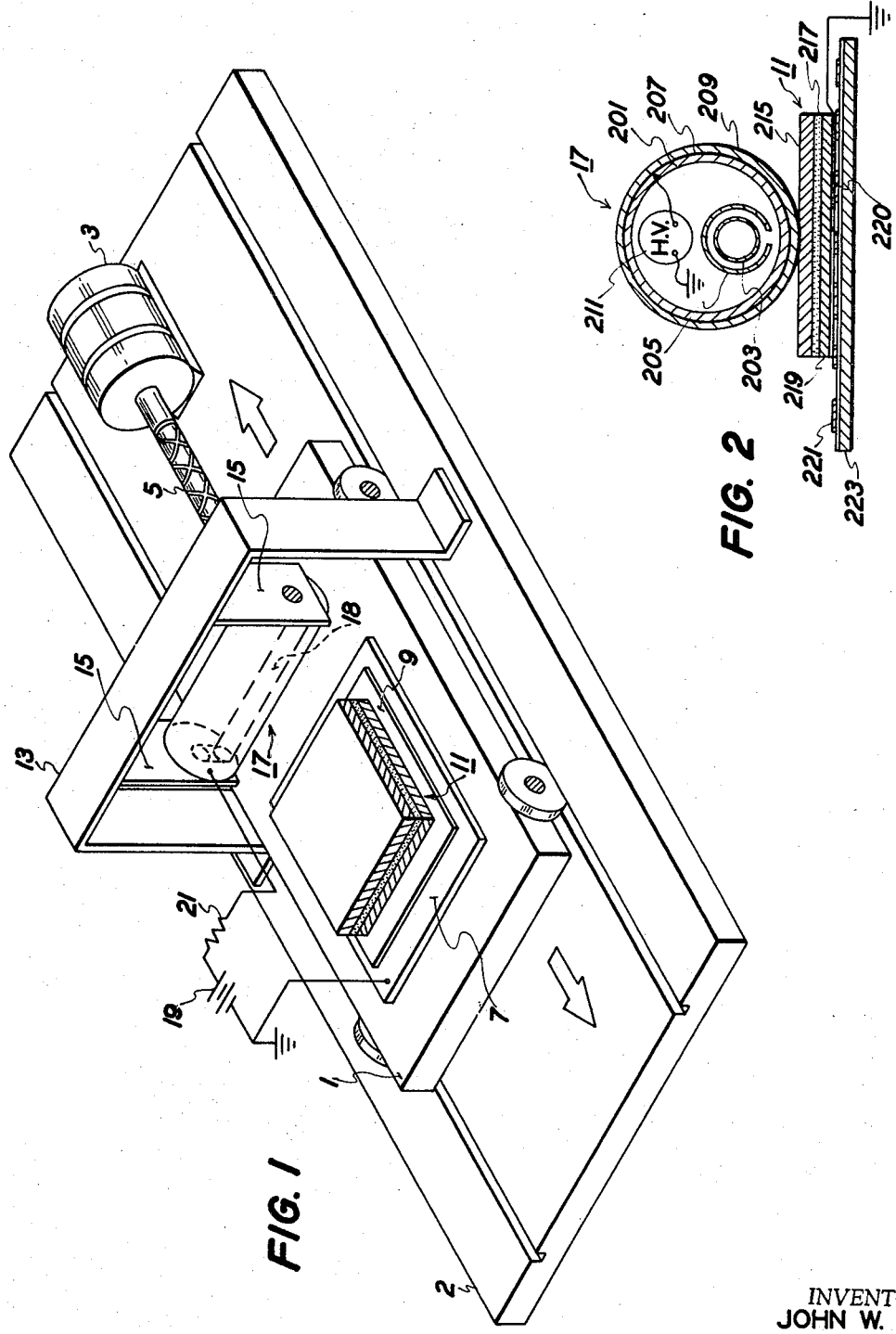

TRANSPARENT ELECTRODE

BACKGROUND OF THE INVENTION

This invention relates to a novel apparatus which subjects an imaging member simultaneously to an electric field and electromagnetic radiation and more specifically, an apparatus for effecting reflex reproduction of graphic originals by means of the manifold imaging process.

The principles of reflex copying are well known as exemplified by the heat reactive thermographic and diffusion transfer reproduction processes. These principles represent an inexpensive optical copying technique by eliminating the need for a copying lens, light box, reduced lighting requirements and the like. While such reflex copying processes have employed an optical system comprising a rotatably mounted cylinder containing a light source, such processes did not require the use of an electric field in order to develop the image copy. Other imaging systems employing an electric field required separate devices for the application of the electric field and electromagnetic radiation in order to develop the image copy.

There has recently been discovered a layer transfer imaging process commonly termed the manifold imaging process utilizing a manifold member or sandwich comprising an electrically photosensitive material between a pair of sheets. Copending application Ser. No. 708,380 filed Feb. 26, 1968 in the U.S. Patent Office describes an imaging system utilizing the manifold sandwich. In this imaging system, an imaging layer is prepared by coating a layer of electrically photosensitive imaging material onto a substrate. In one form the imaging layer comprises a photosensitive material such as metal-free phthalocyanine dispersed in a cohesively weak insulating binder. This coated substrate is called the donor. When needed, the imaging layer is rendered cohesively weak. The process step of weakening the imaging layer is termed activation and in most cases the imaging layer is activated by contacting it with a swelling agent, solvent or partial solvent for the imaging layer or by heating. This step may be eliminated, of course, if the layer retains sufficient residual solvent after having been coated on the substrate from a solution or paste or is sufficiently cohesively weak to fracture in response to the application of electromagnetic radiation and electrical field. After activation a receiver sheet is laid over the surface of the imaging layer. An electrical field is applied across the manifold sandwich while it is exposed to a pattern of electromagnetic radiation, normally visible light, representative of the image to be reproduced. Alternatively, the donor can be electrically charged and exposed prior to placing a receiver sheet over the imaging layer. Upon separation of the donor substrate or sheet and receiver sheet, the imaging layer fractures along the lines defined by the pattern of light and shadow to which the imaging layer has been exposed. Part of the imaging layer is transferred to one of the sheets while the remainder is retained on the other sheet so that a positive image, that is, a duplicate of the original is produced on one sheet while a negative image is produced on the other.

In the contact reflex imaging mode, a separate apparatus for the production of electromagnetic radiation and an electric field require complex and cumbersome equipment. In addition, it is sometimes desirable to expose the imaging member in a continuous operation by feeding the imaging member in the form of a continuous web, through a stationary exposure station. A large amount of friction is generated by moving an electrically charged imaging member across stationary members of the apparatus employed. In some instances the amount of friction thus generated prohibits this type of operation. There has now been discovered a compact and convenient apparatus which subjects an imaging member simultaneously to electromagnetic radiation and an electric field which permits exposure of an imaging member in the form of a continuous web.

SUMMARY OF THE INVENTION

Accordingly, it is an object of this invention to provide an apparatus which overcomes the above noted disadvantages.

It is another object of this invention to provide a novel apparatus for the reflex reproduction of copy by means of the manifold imaging process.

It is another object of this invention to provide a novel apparatus capable of exposing an area to electromagnetic radiation while simultaneously subjecting said area to an electric field.

Another object of this invention is to provide a novel charge bearing apparatus capable of inducing a static electric charge in a photoconductive insulating sheet.

Another object of this invention is to provide an apparatus useful in electrophotographic process.

Other objects and advantages will be apparent from the following detailed description taken in conjunction with the attached drawings.

In accordance with this invention, there is provided an apparatus comprising a transparent rotatable cylinder around which is provided an electrically conductive transparent layer which in turn is covered by a transparent electrically insulating coating. Within the cylinder there is placed a source of electromagnetic radiation. In addition to a source of electromagnetic radiation, the preferred embodiment of this invention provides within the cylinder a source of electric potential which is in electrical communication with the electrically conductive coating on the circumference of the cylinder.

As used in this specification and the appended claims, the term "transparent" is intended to mean the property of transmitting electromagnetic radiation which is produced at a source within the apparatus of this invention. In imaging systems the wavelength of the activating electromagnetic radiation employed is chosen so as to provide a response in the photosensitive material of the imaging member. A visible light source, an ultraviolet light source, an infrared light source or any other suitable source of electromagnetic radiation may be placed within the cylinder. Thus, the apparatus of this invention is equipped with a means for producing the electromagnetic radiation required to activate or produce a response in the imaging member to be employed therewith.

The present invention finds application in the manifold imaging process for making duplicate copies of originals in the contact reflex configuration. In such a configuration, an original document is placed in contact with one side of the manifold imaging member which can be either a donor sheet or the complete manifold sandwich comprising the electrically photosensitive imaging layer between a donor sheet and a receiver sheet. In the contact reflex mode of the manifold process, the donor and receiver sheets are transparent to the electromagnetic radiation employed. The manifold imaging member is brought into contact with the apparatus of this invention such that the electromagnetic radiation emanating from the cylinder passes through the imaging member to the original document and is reflected from the non-image areas of the document back to the imaging member. In one mode of operation, the imaging member is brought into contact with one electrode of an electrical circuit which employs as the opposite electrode the conductive coating on the transparent cylinder so as to place an electric field across the imaging layer of the member. The cylinder is then moved across the imaging member while in rolling contact therewith at a fixed speed. In a preferred configuration, the cylinder is rotatably mounted in a fixed position and the imaging member is placed on a movable bed which is moved along a path bringing the imaging member in contact with the electrically insulating coating on the cylinder. As the imaging member comes in contact with the cylinder, an electric field is established across the imaging member and the imaging member is subjected to electromagnetic radiation from the source within the cylinder. After thus contacting the cylinder, the image is developed in accordance with the imaging process peculiar to the imaging member employed. In the manifold imaging process, the imaging layer fractures in imagewise configuration upon separation of the manifold sandwich while the sandwich is subjected to an electric field. In one of the preferred embodiments of this invention, at least one of the donor and receiver sheets of the manifold sandwich is electrically insulating and capable of retaining an electric charge. As a result of the simultaneous application of an electric field and differential illumination pattern reflected from the document, an imagewise differentiated pattern of electronic charges is induced and trapped at the interface between the photosensitive layer and the above mentioned electrically insulating sheet. During separation of the sheet, this pattern of trapped charge is believed to cause the patternwise separation of differentially exposed areas of the photosensitive coating thus producing the desired reflex image. Thus, image development can take place during or immediately after contact with the cylinder. Alternatively, the electric field across the sandwich can be removed or allowed to dissipate after contact with the cylinder and the image developed at a later time by reestablishing an electric field across the sandwich. The field can be reestablished by any means convenient and the image developed by separating the sandwich while it is subjected to the reestablished electric field.

There will occur to those skilled in the art many different modes of operating the manifold imaging process and other imaging processes in conjunction with the apparatus of this invention and the several modes described herein are intended to be only for purposes of demonstration.

BRIEF DESCRIPTION OF THE DRAWINGS

The advantages of this novel apparatus will become apparent upon consideration of the detailed disclosure and especially when taken in conjunction with the accompanying drawings wherein:

FIG. 1 is a perspective view of an apparatus embodying the present invention;

FIG. 2 is a side sectional view of the apparatus of this invention diagramatically illustrating its use in conjunction with the manifold imaging process.

DETAILED DESCRIPTION OF THE DRAWINGS

Referring now to FIG. 1, there is shown a reversibly movable table 1 driven by drive means 3 through shaft 5. Table 1 contains an electrically conductive plate 7 upon which is laid an original document 9 to be copied. Over the document is laid a manifold sandwich generally designated 11. Suspended from bracket 13 and support arm 15 is cylinder 17 which is rotatably mounted in the usual manner by concentric bearings with electrical connections. In operation, movable table 1 carries the original document and manifold sandwich in the direction of the arrow upon the activation of drive means 3 bringing the manifold sandwich in contact with cylinder 17. An electric field is applied across the sandwich by means of power supply 19 which is connected to conductive plate 7 and resistor 21 which is also connected to the electrically conductive coating on cylinder 17. Power supply 19 also supplies energy to a source of electromagnetic radiation within cylinder 17. As a practical matter, it has been found to be more desirable to supply the energy requirement of the electromagnetic radiation source through the opposite bearing to that through which the conductive coating is supplied. Thus, as movable table 7 travels past cylinder 17, the manifold sandwich is subjected simultaneously to an electric field between the cylinder and plate 7 and to electromagnetic radiation from source 18 within the cylinder. The electromagnetic radiation source is mounted and suspended from concentric bearings so as to allow the source to remain stationary with respect to the cylinder. The manifold sandwich can be passed beneath cylinder 17 to expose the imaging layer of the manifold sandwich at a speed which provides an activating amount of electromagnetic radiation keeping in mind the intensity of the radiation and the sensitivity of the photosensitive material. After sufficient exposure, the manifold sandwich is separated while under an electric field thereby fracturing the imaging layer in imagewise configuration to provide a positive copy of the original image on one of the sheets and a negative copy of the original on the other sheet.

Referring now to FIG. 2, there is generally shown cylinder 17 comprising transparent base 201 having disposed therein a tubular source of electromagnetic radiation such as a filament lamp or fluorescent bulb 203. In the preferred embodiment of this invention, a reflective shield 205 is provided around electromagnetic radiation source 203 to direct the radiation toward one segment of cylinder 201. Transparent cylinder 201 can comprise any suitable material which is transparent to the electromagnetic radiation employed. Thus, most commonly the transparent cylinder is glass and the electromagnetic radiation is in the visible light range. Other transparent materials can be employed keeping in mind the electromagnetic radiation employed. Plastic material such as polymethyl methacrylate sold under the trade names Plexiglass and Lucite by Rohm & Hass Co. and E. I. duPont de Nemours & Co., Inc. can be employed. On the circumference of transparent cylinder 201, there is coated a layer of electrically conductive material 207. The conductive coatings can comprise any electrically conductive material which is transparent to the electromagnetic radiation employed. Thus, metals such as aluminum, gold, silver, copper, magnesium and other metals can be deposited on the cylinder in thin coatings to provide the conductive layer while allowing electromagnetic radiation to pass through. In a preferred embodiment of this invention, a tin oxide coated glass cylinder is employed.

The conductive coating 207 around the cylinder can be provided by either coating a thin conductive film directly on the outside of the cylinder or a conductive coating on a transparent film substrate can be employed as a covering over the cylinder with the conductive coating pressing against the outer surface of the cylinder. For example, a conductive coating such as aluminum coated on transparent flexible polyethylene terephthalate film can be wrapped tightly around a transparent cylinder to provide an insulated conductive coating on the cylinder.

The thickness of the conductive coating 207 can vary greatly. Normally the thickness of the conductive coating is in the range of from about 0.001 microns to about 0.1 microns. Of course, other thicknesses can be employed if suitable.

Conductive coating 207 is covered with an insulating film 209 which serves to provide an electrical barrier between the conductive coating and the materials which come in contact with the cylinder. Such insulating films are preferably high dielectric strength polymeric materials. Typical insulating materials include polyethylene, polypropylene, polyesters, polyethylene terephthalate, polystyrene, cellulose acetate and polystyrene. Other electrically insulating materials possessing the required transparency to electromagnetic radiation will occur to those skilled in the art. Mylar (a polyester formed by the condensation reaction between ethylene glycol and terephthalic acid available from E. I. duPont de Nemours & Co., Inc.) is preferred because of its durability and its excellent insulative qualities. Mylar having a transparent conductive evaporated metal coating on one side is particularly preferred because when wrapped around a glass cylinder it provides both the conductive and insulating coating around the cylinder.

In a particularly preferred embodiment of this invention, there is provided within the transparent cylinder 201 an electrical power supply 211 which can be employed to provide a high D. C. voltage to the conductive layer. This power supply can then be grounded through conventional concentric bearings on one end of the cylinder which ground can be placed in communication with a second electrode so as to provide an appropriate electric field depending upon the imaging system in which the apparatus is employed. Alternatively, an external power supply can be employed by providing an electrical connection between the conductive coating and a sliding or rolling contact placed within the concentric bearing of the cylinder.

Also shown in FIG. 2 is manifold sandwich generally indicated as 11 comprising receiver sheet 215, imaging layer 217 and donor sheet 219. Donor sheet 219 is provided with a conductive backing 220. Conductive coating 220 can be any transparent coating such as cellophane or a vacuum deposited metal of a thickness so as to be at least about 80 percent transparent to the electromagnetic radiation employed. Below manifold sandwich 11, there is placed an original document 221 in optical reflex contact with manifold sandwich 11. Original document 221 rests upon a base 223 which is connected to a common ground with power supply 211 providing an electric field across manifold sandwich 11. By connecting the conductive surface 220 to a common ground with power supply 211, an electric field can be established across the manifold sandwich. This arrangement is a preferred embodiment of this invention because the original document is not included within the electric field thus eliminating a variable for which compensation must be made in the imaging process.

Although for purposes of illustration the apparatus of this invention is employed in conjunction with the manifold imaging process, it can be employed in any imaging process requiring the simultaneous application of electromagnetic radiation and an electric field. Thus, in processes such as photoelectrophoresis the apparatus of this invention can be advantageously employed. A typical photoelectrophoretic imaging process employing the phenomena of photoelectrophoresis is disclosed in U.S. Pat. No. 3,384,565 which is incorporated herein by reference. In such process the apparatus of this invention can be employed as the transparent electrode and light source.

Another process in which the apparatus of this invention can be employed is the process of forming a latent polarization image in a material showing the phenomenon of persistent internal polarization. The phenomenon of persistent internal polarization is known to the art and is discussed in detail, for example, in Physical Review, Vol. 97, No. 6 (1955), pages 1,596–1,610 and Photographic Science and Engineering, Vol. 4, No. 6 (1960), pages 345–353 which is incorporated herein by reference. Generally, the imaging process involves the generation of mobile charges in a photoconductive insulating material under the influence of activating radiation such as light and the simultaneous or subsequent separation of these charges in the material exhibiting persistent internal polarization under the influence of an electric field applied to the material. Due to the nature of the material, the polarization persists after removal of the activating radiation and the polarizing field. Detection means are known for developing the latent image. The apparatus of this invention can be employed in such processes to provide the transparent electrode and the activating radiation. More specifically, an example of an imaging process employing materials exhibiting the property of persistent internal polarization can be found in U.S. Pat. No. 3,005,707 which is incorporated herein by reference. The transparent electrode employed in such process can be supplied, in combination with the means for exposing the persistently polarizable body to electromagnetic radiation, by the apparatus of this invention.

Another imaging process in which the apparatus of this invention can be employed is the xerographic process and particularly induction xerography. The apparatus of this invention can be employed to induce an electric field across the xerographic plate and to simultaneously supply the electromagnetic radiation.

The apparatus of this invention can be employed in the process of electrophotography which is characterized by uniformly charging the surface of an insulating layer of a xerographic plate. In such a process the plate comprises a conductive substrate, photoconductive layer and an insulating layer overlying the photoconductive layer. Either subsequent to or simultaneously with the uniform charging of the insulating layer, the plate is exposed to imagewise illumination followed by a second uniform electrical charge and uniform illumination. Typical examples of such a process are described in U.S. Pat. No. 3,234,019 and Japanese Patent Publication No. 42–23910 dated Nov. 17, 1967, all of which is incorporated herein by reference. The apparatus of this invention can be employed in such process to subject the plate to an electric field and to illuminate the plate.

DESCRIPTION OF THE PREFERRED EMBODIMENTS

The following examples further specifically illustrate the present invention. The examples below are intended to illustrate various preferred embodiments of the apparatus and are not intended to limit the scope of this invention. The parts and percentages are by weight unless otherwise indicated.

EXAMPLE I

A donor to be employed in the manifold imaging process described above is first prepared by providing an electrically photosensitive imaging layer on a substrate. A black layer is prepared by first providing the "X" form of phthalocyanine in accordance with the procedure of Example I of U.S. Pat. No. 3,357,989 which is incorporated herein by reference. About 37.5 grams of x-phthalocyanine is mixed with 42 grams of Irgazine Red available from Geigy Chemical Company, 18 grams purified Algol Yellow, C.I. No. 67300 available from General Dyestuffs Co. and about 900 ml. of clay purified DC naphtha are placed in a jar and milled for 4 hours at 60 rpm using five-eighths to three-fourths inch diameter flint stones. A binder solution is also prepared by placing in a 600 ml. glass beaker about 45 grams of purified polyethylene DYLT available from Union Carbide Corp., about 1.5 grams purified Polyethylene DYDT also available from Union Carbide Corp., about 22.5 grams of Paraflint RG, a low molecular weight paraffinic material available from the Moore & Munger Co., 7.5 grams of purified Elvax 420 a vinylacetate-ethylene copolymer available from E. I. duPont de Nemours Inc., about 37.5 grams of a modified polystyrene available as Piccotex 100 from Pennsylvania Industrial Chemical Company together with about 300 ml. of purified Sohio Odorless Solvent 3440 available from the Standard Oil Co. The mixture is heated on a hot plate with stirring until a water-clear solution is obtained. The beaker is removed from the hot plate and allowed to cool to room temperature forming a white paste. The cooled binder paste is added to the premilled pigment in the jar mill and milled together for about 16 hours. After milling, the mixture is heated to 65° C. for 2 hours and then cooled to room temperature. About 1,000 ml. of reagent grade isopropyl alcohol is added to the jar and the mixture is milled for an additional 20 minutes. The dispersion of electrically photosensitive material in the binder is then coated on a 3 mil Mylar sheet with a No. 22 wire-wound drawdown rod to provide a coating of 0.27 grams/ft.$^2$ which is dried at 120° F. The coated Mylar is employed as a donor sheet in the manifold imaging process described above. The coated sheet with its coated side out is taped to a cylinder comprising a Pyrex glass tube around which is wrapped a one-half mil thick sheet of Mylar having coated on its inner surface a thin transparent coating of aluminum. The donor is activated with Isopar E, a synthetic aliphatic hydrocarbon available from Humble Oil and Refining Co., to render it cohesively weak. While in the dark, the positive side of a 1,200 volt d.c. power supply with a negative ground is connected to the conductive coating around the cylinder. A tubular 4 watt fluorescent cool white light bulb surrounded by a light shield mounted in the cylinder is illuminated. The light shield contains a slit one-eighth inch wide along its length to provide for exposure of the donor while it is in contact with the receiver sheet. An original document is laid on a conductive movable table and covered with a 2 mil thick sheet of Mylar. The table is connected to the ground side of the power supply and is moved past the roller so as to bring the receiver sheet and the donor sheet into contact with each other and to pass the thus formed manifold sandwich beneath the exposure slit of the light shield within the cylinder. The table speed is 1.1 inches per second and the total light intensity measured by means of a quartz window thermopile is 380 microwatts per square centimeter per second. The light passes through the manifold sandwich onto the original and the light not absorbed by the original is reflected back onto the imaging layer. After passing by the exposure slit, the movement of the table separates the manifold sandwich whereupon there is found a negative image on the donor sheet and a positive image on the receiver sheet. Either image can be projected as a transparency or bright image display.

EXAMPLE II

Example I is repeated with the exception that the light intensity is reduced to about 300 microwatts per square centimeter per second by reducing the voltage to the fluorescent bulb. The table is moved past the cylinder at a speed of 0.75 inches per second. As in Example I, a negative image is produced on the donor while a positive image is produced on the receiver sheet.

EXAMPLE III

The procedure of Example I is repeated except that the back of the receiver sheet is coated with a transparent conductive coating of aluminum which coating is connected to the ground side of the power supply so as to provide a field across the manifold sandwich but excluding the document to be copied. After exposure under an electric field, the manifold sandwich is separated to provide a positive and a negative image of the original document as in Example I.

It is apparent from the foregoing description of the apparatus of this invention that the form of construction has been provided which offers substantial advantages in construction and assembly over the previously known means for subjecting an imaging member to electromagnetic radiation and an electric field. The present invention is accordingly not to be restricted to the exact form of construction shown in the drawings, but it is to be interpreted as covering any substantially equivalent structure which incorporates the advantages specified in the present case.

What is claimed is:

1. In a copying apparatus, a rotatable cylinder transparent to electromagnetic radiation having an electrically conductive transparent coating thereon and a transparent electrically insulating coating over said electrically conductive coating, said cylinder having therein a source of electromagnetic radiation, said conductive coating being adapted to associate with an exterior electrode so as to place an electric field across at least a portion of an area capable of receiving electromagnetic radiation from said source, an exterior electrode positioned to receive a sandwich comprising an electrically photo-sensitive imaging layer sandwiched between a donor layer and a receiver layer having an original document adjacent at least one side of said sandwich within said area capable of receiving electromagnetic radiation from said source, whereby said imaging layer and said original document is exposed to said radiation while subjected to an electric field between said electrodes.

2. The apparatus of claim 1 wherein said receiver layer is conductive and comprises said exterior electrode.

3. The apparatus of claim 1 wherein said receiver layer contains a conductive layer, which conductive layer comprises said exterior electrode.

4. The apparatus of claim 1 further including a source of electric potential within said cylinder in electrical communication with the conductive coating.

5. The apparatus of claim 1 wherein the source of electromagnetic radiation provides radiation in the visible light range and the rotatable cylinder is a glass cylinder.

6. The apparatus of claim 1 wherein the electrically insulating coating comprises a thermoplastic material.

7. The apparatus of claim 1 wherein the electrically conductive coating is deposited upon the cylinder.

8. The apparatus of claim 1 wherein the conductive coating is deposited upon the inner surface of the electrically insulating coating.

9. The apparatus of claim 1 further including a source of electric potential within said cylinder.

10. The apparatus of claim 1 further including a source of electric potential without said cylinder.

11. The apparatus of claim 1 wherein the electrically conductive transparent coating is a metallic coating.

12. The apparatus of claim 11 wherein the thickness of the conductive coating is in the range of from about 0.05 microns to about 55 microns.

13. An apparatus for simultaneously exposing an electrically photosensitive imaging layer and an original document to electromagnetic radiation while subjecting said layer to an electric field which comprises an electric power supply, a rotatable cylinder transparent to said electromagnetic radiation having an electrically conductive transparent coating thereon, said conductive coating forming one electrode of said power supply, a transparent electrically insulating coating over said electrically conductive coating, said cylinder having therein a source of electromagnetic radiation and said electric power supply, said conductive coating being adapted to associate with an exterior electrode so as to place an electric field across at least a portion of an area capable of receiving electromagnetic radiation from said source and a second moveable electrode of said power supply in spaced relationship to electrically insulating layer so as to receive a sandwich comprising an electrically photosensitive imaging layer sandwiched between a donor layer and a receiver layer and said original document adjacent at least one side of said sandwich in said area capable of receiving electromagnetic radiation from said source.

14. The apparatus of claim 13 wherein the electrically photosensitive imaging layer is cohesively weak and sandwiched between a donor sheet and a receiver sheet.

15. The apparatus of claim 13 wherein the thickness of the conductive coating is in the range of from about 0.05 microns to about 55 microns.

* * * * *